United States Patent
Cho et al.

(10) Patent No.: US 10,038,340 B2
(45) Date of Patent: Jul. 31, 2018

(54) WIRELESS POWER TRANSMISSION METHOD AND APPARATUS FOR IMPROVING SPECTRUM EFFICIENCY AND SPACE EFFICIENCY BASED ON IMPEDANCE MATCHING AND RELAY RESONANCE

(71) Applicant: Electronics and Telecommunications Research Institute, Daejeon (KR)

(72) Inventors: In Kui Cho, Daejeon (KR); Seong Min Kim, Daejeon (KR); Jung Ick Moon, Daejeon (KR); Je Hoon Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 14/483,382

(22) Filed: Sep. 11, 2014

(65) Prior Publication Data

US 2015/0108850 A1     Apr. 23, 2015

(30) Foreign Application Priority Data

Oct. 21, 2013 (KR) .................. 10-2013-0125591
Mar. 18, 2014 (KR) .................. 10-2014-0031559

(51) Int. Cl.
| H02J 17/00 | (2006.01) |
| H02J 50/12 | (2016.01) |
| H02J 50/50 | (2016.01) |
| H02J 50/90 | (2016.01) |

(52) U.S. Cl.
CPC .............. *H02J 50/12* (2016.02); *H02J 17/00* (2013.01); *H02J 50/50* (2016.02); *H02J 50/90* (2016.02)

(58) Field of Classification Search
CPC ............. H02J 50/10; H02J 50/12; H02J 50/50
See application file for complete search history.

(56) References Cited

U.S. PATENT DOCUMENTS

2009/0058189 A1* 3/2009 Cook .................. H04B 5/0037
                                                          307/104
2009/0224856 A1   9/2009 Karalis et al.
(Continued)

FOREIGN PATENT DOCUMENTS

| CN | 102239622 A | 11/2011 |
| KR | 1020100042292 A | 4/2010 |

(Continued)

OTHER PUBLICATIONS

Ya Feng Deng, Wireless power supply technology, 2013, pp. 1-12, Yejin Industry Printing Company, Beijing, China.

*Primary Examiner* — Jared Fureman
*Assistant Examiner* — Joel Barnett
(74) *Attorney, Agent, or Firm* — William Park & Associates Ltd.

(57) ABSTRACT

Provided is a wireless power transmission method and apparatus for improving spectrum efficiency and space efficiency based on impedance matching and relay resonance, the method including detecting an input impedance at a resonant frequency, matching a transmitting port impedance to a real number value of the detected input impedance, and transmitting power to a receiving resonator smaller than a transmitting resonator using the relay resonator.

12 Claims, 26 Drawing Sheets

(56) References Cited

U.S. PATENT DOCUMENTS

| | | | |
|---|---|---|---|
| 2010/0123452 A1* | 5/2010 | Amano | B60L 11/182 |
| | | | 323/359 |
| 2010/0201316 A1* | 8/2010 | Takada | B60L 11/182 |
| | | | 320/108 |
| 2012/0043172 A1* | 2/2012 | Ichikawa | B60L 5/005 |
| | | | 191/45 R |
| 2012/0161532 A1* | 6/2012 | Ogawa | H01Q 7/00 |
| | | | 307/104 |
| 2013/0221757 A1 | 8/2013 | Etri | |
| 2013/0257174 A1 | 10/2013 | Etri | |
| 2013/0313893 A1* | 11/2013 | Ichikawa | H02J 17/00 |
| | | | 307/9.1 |
| 2014/0077614 A1* | 3/2014 | Park | H01F 38/14 |
| | | | 307/104 |

FOREIGN PATENT DOCUMENTS

| | | |
|---|---|---|
| KR | 1020100091112 A | 8/2010 |
| WO | 2011062827 A2 | 5/2011 |
| WO | 2012111085 A1 | 8/2012 |

* cited by examiner

Transmission distance: 20cm, $f_o$=1.935MHz, $S_{21}$=-0.775dB

Transmission distance: 15cm, $f_0$=1.854MHz, $S_{21}$=-0.691dB

Transmission distance: 10cm, $f_0$=1.767MHz, $S_{21}$=-0.658dB

Transmission distance: 5cm, $f_o$=1.704MHz, $S_{21}$=-0.590dB

Transmission distance: 15cm, $f_0$=1.854MHz, $S_{21}$=-0.691dB

Transmission distance: 15cm, $P_1$=18Ω, $f_o$=1.935MHz, $S_{21}$=-0.444dB

Transmission distance: 10cm, $f_0$=1.767MHz, $S_{21}$=-0.658dB

Transmission distance: 10cm, $P_1$=5Ω, $f_o$=1.935MHz, $S_{21}$=-0.095dB

Transmission distance: 5cm, $f_o$=1.704MHz, $S_{21}$=-0.590dB

Transmission distance: 5cm, $P_1=3\Omega$, $f_o=1.935$MHz, $S_{21}=-0.069$dB

Transmission distance: 5cm, $f_o$=1.894MHz, $S_{21}$=-2.513dB

Transmission distance: 10cm, $f_o$=1.894MHz, $S_{21}$=-6.593dB

Transmission distance: 15cm, $f_o$=1.894MHz, $S_{21}$=-11.03dB

Transmission distance: 20cm, $f_o$=1.894MHz, $S_{21}$=-18.86dB $P_1$−143Ω, Transmission distance: 5cm, $f_o$−1.894MHz, $S_{21}$−−1.650dB $P_1=270\Omega$, Transmission distance: 10cm, $f_o=1.894$MHz, $S_{21}=-3.819$dB $P_1=390\Omega$, Transmission distance: 15cm, $f_o=1.894$MHz, $S_{21}=-7.072$dB $P_1=450\Omega$, Transmission distance: 20cm, $f_0=1.894$MHz, $S_{21}=-10.61$dB

WIRELESS POWER TRANSMISSION METHOD AND APPARATUS FOR IMPROVING SPECTRUM EFFICIENCY AND SPACE EFFICIENCY BASED ON IMPEDANCE MATCHING AND RELAY RESONANCE

CROSS-REFERENCE TO RELATED APPLICATION

This application claims the priority benefit of Korean Patent Application No. 10-2013-0125591, filed on Oct. 21, 2013, and Korean Patent Application No. 10-2014-0031559, filed on Mar. 18, 2014, in the Korean Intellectual Property Office, the disclosures of which are incorporated herein by reference.

BACKGROUND

1. Field of the Invention

Embodiments of the present invention relate to a wireless power transmission method and apparatus for improving spectrum efficiency and space efficiency based on impedance matching and relay resonance.

2. Description of the Related Art

Technology for wirelessly transmitting energy through mutual resonance based on magnetic resonance was proposed by the Massachusetts Institute of Technology (MIT) in 2007. The proposed technology involves a helical structure and a resonant frequency of 10 megahertz (MHz). A structural size of a helical resonator is approximately 600 millimeters (mm) in diameter, and has 5.25 helical turns. A line thickness is approximately 6 mm in diameter, and a total helical thickness is approximately 200 mm. A single signal feeding roof is approximately 250 mm. Here, an issue of splitting of resonant frequencies of resonators may occur as magnetic resonators become closer to one another. Thus, an issue of a resonant frequency differing from an initial resonant frequency may arise. Such a physical issue may occur in general resonant structures. Such a resonant frequency shift issue may result in inconvenience, requiring a resonant frequency tracking operation.

Also, the technology for wirelessly transmitting energy may be used for more diverse applications when a size of a receiving resonator is smaller. However, the smaller the size of the receiving resonator, the smaller a power transmission distance. Thus, the small-sized receiving resonator may have a spatial limitation. For example, when the receiving resonator has a diameter of R, designing and manufacturing the receiving resonator to have a transmission distance with a radio frequency (RF) efficiency of 80% or higher that may satisfy the diameter R of the receiving resonator may be challenging. Although such a small-sized resonator may be developed, the transmission distance may be limited to the diameter of the resonator. In general, wireless power transmission technology based on magnetic resonance may have a characteristic of mid-distance transmission with the transmission distance of approximately 1 meter (m). In general, the diameter of the resonator may be considered a limitation to the transmission distance. Accordingly, technology for expanding the transmission distance may be required.

SUMMARY

An aspect of the present invention provides an apparatus and a method that may be simply implemented by matching only a transmitting port impedance, without matching a receiving port impedance, and matching only a real number of the transmitting port impedance.

Another aspect of the present invention provides an apparatus and a method that may maximize spectrum efficiency by matching a transmitting port impedance to a real number value of an input impedance and unifying resonant frequencies in an event of a decreased distance between a transmitting resonator and a receiving resonator.

Still another aspect of the present invention provides an apparatus and a method that may maximize efficiency by controlling an amount of power and an input impedance based on a status of a wireless power receiving apparatus, minimize power surplus by providing power with a required load, and unify resonant frequencies.

Yet another aspect of the present invention provides an apparatus and a method that may increase a power transmission distance using a receiving resonator smaller than a transmitting resonator by disposing, behind the receiving resonator, a relay resonator having a size identical to a size of the transmitting resonator.

Further another aspect of the present invention provides an apparatus and a method that may expand a near field for power transmission by increasing a transmission distance of a small-sized receiving resonator using a relay resonator and overcoming a spatial limitation in the power transmission.

According to an aspect of the present invention, there is provided a wireless power transmitting apparatus including an input impedance detector to detect an input impedance of a transmitting resonator connected to the wireless power transmitting apparatus at a resonant frequency, a control signal output unit to output a control signal to control a transmitting port impedance based on the input impedance, a transmitting port impedance converter to convert the transmitting port impedance based on the control signal, and a power transmitter to transmit power to a wireless power receiving apparatus through the transmitting resonator at the resonant frequency based on the converted transmitting port impedance. The input impedance may be adjusted based on a distance between the transmitting resonator and a receiving resonator connected to the wireless power receiving apparatus.

The transmitting port impedance converter may convert the transmitting port impedance to match a real number value of the input impedance based on the control signal.

The transmitting port impedance converter may convert the transmitting port impedance by controlling a distance between the transmitting resonator and a feeding coil used to provide power to the transmitting resonator.

The control signal output unit may output the control signal based on an amount of power consumed in the wireless power receiving apparatus and a radio frequency/direct current (RF/DC) conversion efficiency of the wireless power receiving apparatus.

According to another aspect of the present invention, there is provided a wireless power receiving apparatus including a power receiver to receive power from a transmitting resonator connected to a wireless power transmitting apparatus at a resonant frequency, and a load unit consuming the received power. The wireless power transmitting apparatus may convert a transmitting port impedance based on an input impedance of the transmitting resonator detected at the resonant frequency and transmit power through the transmitting resonator.

The wireless power transmitting apparatus may convert the transmitting port impedance to match a real number value of the input impedance.

The wireless power transmitting apparatus may convert the transmitting port impedance by controlling a distance between the transmitting resonator and a feeding coil used to provide power to the transmitting resonator.

The input impedance may be adjusted based on a distance between the transmitting resonator and a receiving resonator connected to the wireless power receiving apparatus.

According to still another aspect of the present invention, there is provided a wireless power transfer apparatus including a transmitting resonator to transmit power generated from a wireless power transmitting apparatus to a receiving resonator at a resonant frequency, and the receiving resonator to receive the power from the transmitting resonator using a relay resonator. A size of the receiving resonator may be smaller than a size of the transmitting resonator. The relay resonator may control a receiving efficiency of the receiving resonator by adjusting a distance from the receiving resonator.

The wireless power transmitting apparatus may convert a transmitting port impedance based on an input impedance of the transmitting resonator detected at the resonant frequency and generate power.

The wireless power transmitting apparatus may convert the transmitting port impedance to match a real number value of the input impedance.

The wireless power transmitting apparatus may convert the transmitting port impedance by controlling a distance between the transmitting resonator and a feeding coil used to provide power to the transmitting resonator.

The input impedance may be adjusted based on a distance between the transmitting resonator and the receiving resonator connected to a wireless power receiving apparatus.

The relay resonator may have a size identical to the size of the transmitting resonator.

According to yet another aspect of the present invention, there is provided a wireless power transmitting method including detecting an input impedance of a transmitting resonator connected to a wireless power transmitting apparatus at a resonant frequency, outputting a control signal to adjust a transmitting port impedance based on the input impedance, converting the transmitting port impedance based on the control signal, and transmitting power to a wireless power receiving apparatus through the transmitting resonator at the resonant frequency based on the converted transmitting port impedance. The input impedance may be adjusted based on a distance between the transmitting resonator and a receiving resonator connected to the wireless power receiving apparatus.

The converting may be performed to match the transmitting port impedance to a real number value of the input impedance based on the control signal.

The converting may be performed by controlling a distance between the transmitting resonator and a feeding coil used to provide power to the transmitting resonator.

According to further another aspect of the present invention, there is provided a wireless power receiving method including receiving power from a transmitting resonator connected to a wireless power transmitting apparatus at a resonant frequency, and consuming the received power. The wireless power transmitting apparatus may convert a transmitting port impedance based on an input impedance of the transmitting resonator detected at the resonant frequency and transmit power through the transmitting resonator.

The wireless power transmitting apparatus may convert the transmitting port impedance to match the transmitting port impedance to a real number value of the input impedance.

The wireless power transmitting apparatus may convert the transmitting impedance by controlling a distance between the transmitting resonator and a feeding coil used to provide power to the transmitting resonator.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
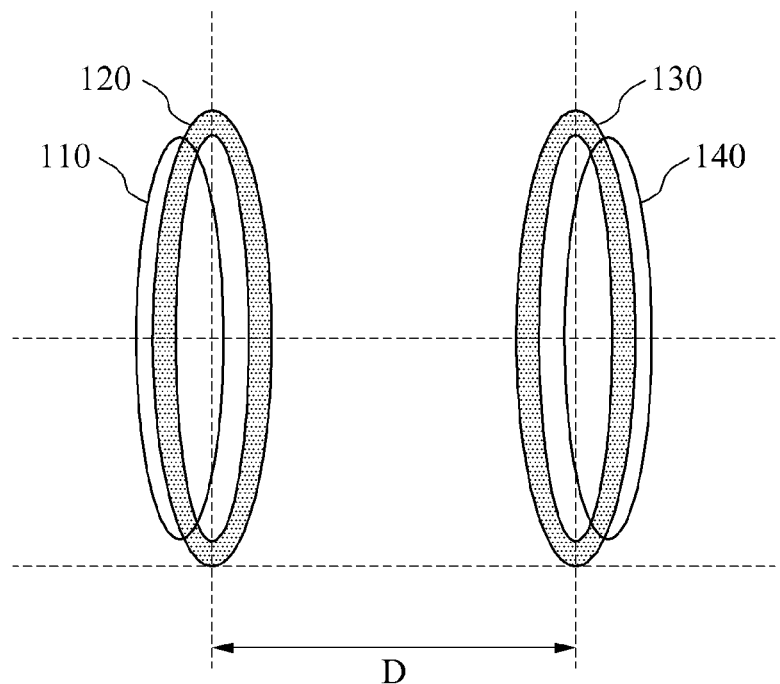
FIG. 1 is a diagram illustrating an example of a wireless power transfer apparatus including a transmitting resonator and a receiving resonator of identical sizes according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating an example of a wireless power transfer apparatus including a transmitting resonator 120 and a receiving resonator 130 of identical sizes according to an embodiment of the present invention.

Referring to FIG. 1, the wireless power transfer apparatus may include a feeding coil 110, the transmitting resonator 120, the receiving resonator 130, and a receiving coil 140.

The feeding coil 110 may feed power generated from a wireless power transmitting apparatus to the transmitting resonator 120. The feeding coil 110 may adjust a coupling coefficient $k_{12}$ based on a distance from the transmitting resonator 120. The feeding coil 110 may control a transmitting port impedance by adjusting the coupling coefficient $k_{12}$. Accordingly, the feeding coil 110 may match the transporting impedance to an input impedance.

The transmitting resonator 120 may be connected to the wireless power transmitting apparatus and transmit power to the receiving resonator 130. The transmitting resonator 120 may transmit power to the receiving resonator 130 using a resonant frequency identical to a resonant frequency of the receiving resonator 130.

The receiving resonator 130 may be connected to a wireless power receiving apparatus and receive power from the transmitting resonator 120. The receiving resonator 130 may receive power from the transmitting resonator 120 using a resonant frequency identical to a resonant frequency of the transmitting resonator 120. For example, the receiving resonator 130 may have a size identical to a size of the transmitting resonator 120.

Here, a coupling coefficient $k_{23}$ between the resonators may be determined based on a distance (D) between the transmitting resonator 120 and the receiving resonator 130. The coupling coefficient $k_{23}$ may decrease as the D between the transmitting resonator 120 and the receiving resonator 130 increases.

The receiving coil 140 may transfer the power received from the receiving resonator 130 to the wireless power receiving apparatus. The receiving coil 140 may adjust a coupling coefficient $k_{34}$ based on a distance from the receiving resonator 130. The receiving coil 140 may control a receiving port impedance by adjusting the coupling coefficient $k_{34}$. Accordingly, the receiving coil 140 may perform receiving port impedance matching.

Here, a value of D between the transmitting resonator 120 and the receiving resonator 130 may change a characteristic of power transfer.

Figure 2A:
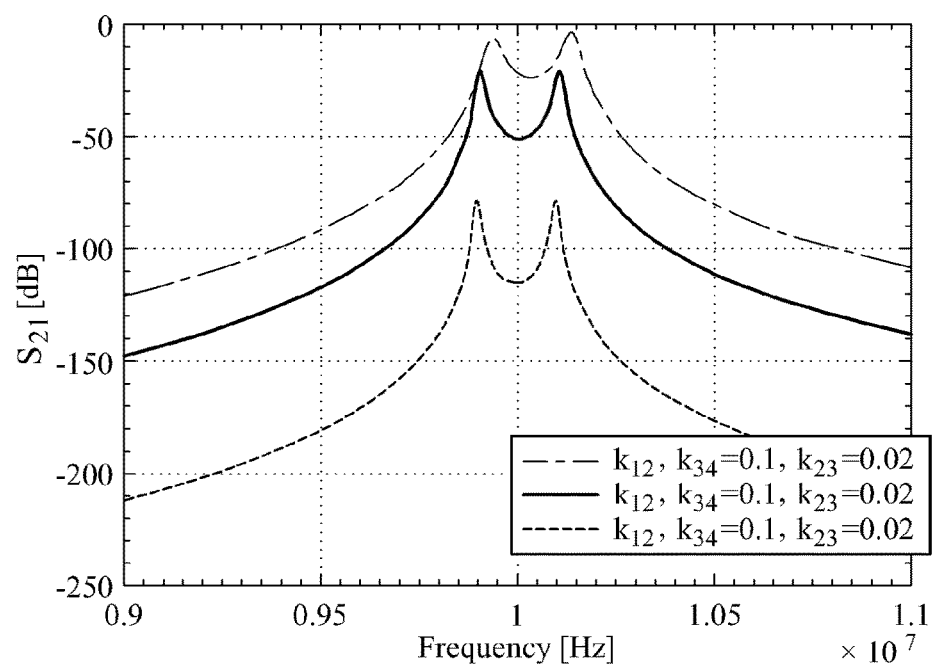
FIGS. 2A and 2B are graphs illustrating a transfer function $S_{21}$ and an input impedance based on coupling coefficients $k_{12}$ and $k_{34}$ according to an embodiment of the present invention.
Figure 2B:
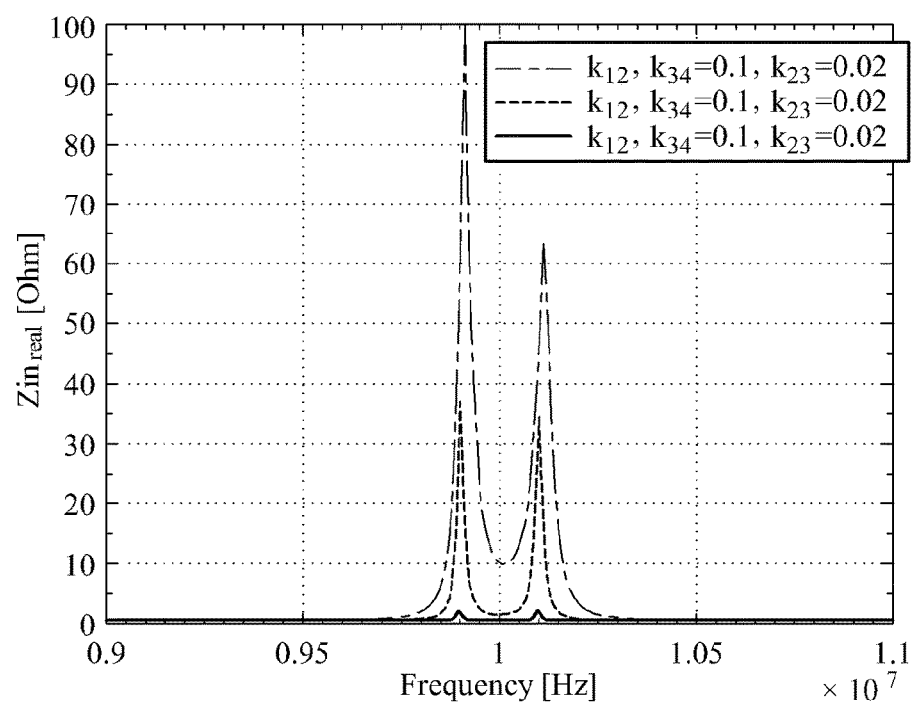

FIGS. 2A and 2B are graphs illustrating a transfer function $S_{21}$ and an input impedance $Z_{in}$ based on coupling coefficients $k_{12}$ and $k_{34}$ according to an embodiment of the present invention.

Here, the $Z_{in}$ may indicate an impedance of a wireless power transfer apparatus in association with a wireless power transmitting apparatus.

Referring to the graphs of FIGS. 2A and 2B, the $S_{21}$ may increase as the $k_{12}$ and the $k_{34}$ increase. For example, in a 50 ohm ($\Omega$) system, the $S_{21}$ may have a maximum value when the $Z_{in}$ matches 50$\Omega$.

The $k_{12}$ may increase as a distance between a feeding coil and a transmitting resonator decreases. Also, the $k_{34}$ may increase as a distance between a receiving resonator and a receiving coil decreases. Here, a coupling coefficient $k_{23}$ having a constant value may indicate that a distance between the transmitting resonator and the receiving resonator is constant.

The $Z_{in}$ may have a value close to 50$\Omega$ by increasing the $k_{12}$ and the $k_{34}$. In the 50$\Omega$ system, power transfer may be desirably performed by adjusting the feeding coil and the receiving coil and matching the $Z_{in}$ to 50$\Omega$.

Figure 3A:
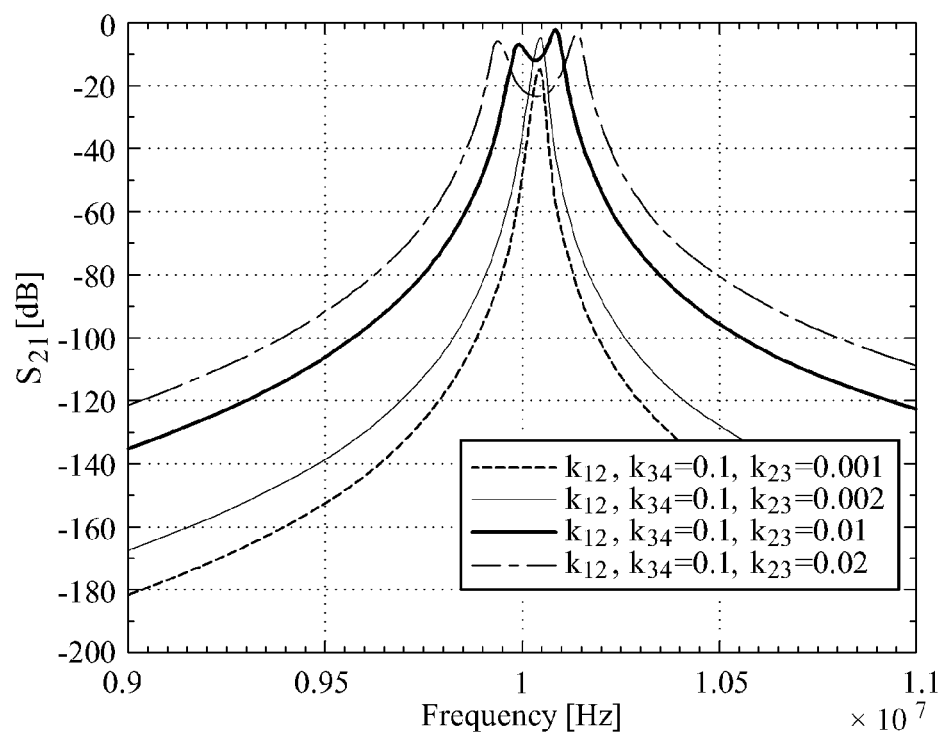
FIGS. 3A and 3B are graphs illustrating a transfer function $S_{21}$ and an input impedance based on a coupling coefficient $k_{23}$ of a transmitting resonator and a receiving resonator according to an embodiment of the present invention.
Figure 3B:
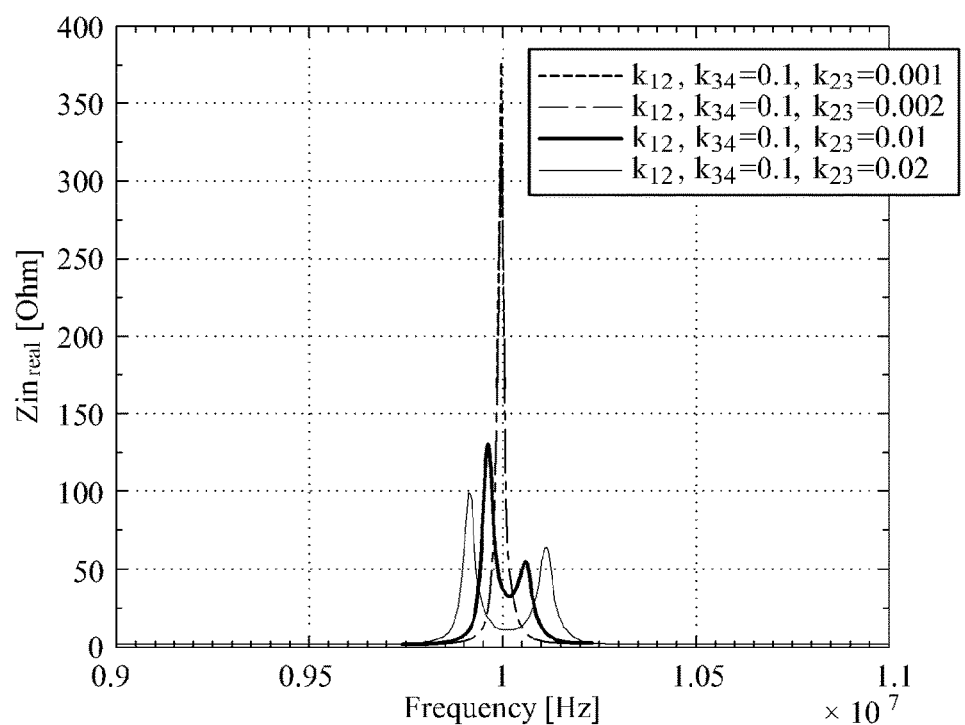

FIGS. 3A and 3B are graphs illustrating a transfer function $S_{21}$ and an input impedance $Z_{in}$ based on a coupling coefficient $k_{23}$ of a transmitting resonator and a receiving resonator according to an embodiment of the present invention.

Referring to the graphs of FIGS. 3A and 3B, generally, the higher the $k_{23}$, the higher the $S_{21}$. However, in a vicinity of $1 \times 10^7$ hertz (Hz), the $S_{21}$ may not increase although the $k_{23}$ increases. That is, the $Z_{in}$ may decrease as the $k_{23}$ increases. The $S_{21}$ may decrease as a distance between the transmitting resonator and the receiving resonator increases because an increase in the $Z_{in}$ corresponds to an increase in the distance between the transmitting resonator and the receiving resonator. For example, in a 50$\Omega$ system, the $S_{21}$ may have a maximum value when the $Z_{in}$ matches 50$\Omega$.

Here, the smaller the distance between the transmitting resonator and the receiving resonator, the greater the $k_{23}$. Also, coupling coefficients $k_{12}$ and $k_{34}$ having constant values may indicate that a distance between the transmitting resonator and a feeding coil and a distance between the receiving resonator and a receiving coil are constant. The $S_{21}$ may indicate power transmission efficiency.

Thus, wireless power transmission may be performed using the transmitting resonator and the receiving resonator based on an input impedance and a transmitting port impedance. Here, the smaller the distance between the transmitting resonator and the receiving resonator, the lower the input impedance. The input impedance may be adjusted based on the distance between the transmitting resonator and the receiving resonator.

FIGS. 4A through 5B are graphs illustrating a transfer function $S_{21}$ depending on a transmission distance based on a transmitting resonator and a receiving resonator of identical sizes, and Smith charts according to an embodiment of the present invention.

The $S_{21}$ indicated in FIGS. 4A through 5B may be based on a transmitting resonator with a diameter of 30 centimeters (cm) and a receiving resonator with a diameter of 30 cm, and measured via a network analyzer. Here, a transmitting port impedance and a receiving port impedance may be 50$\Omega$.

Figure 4A:
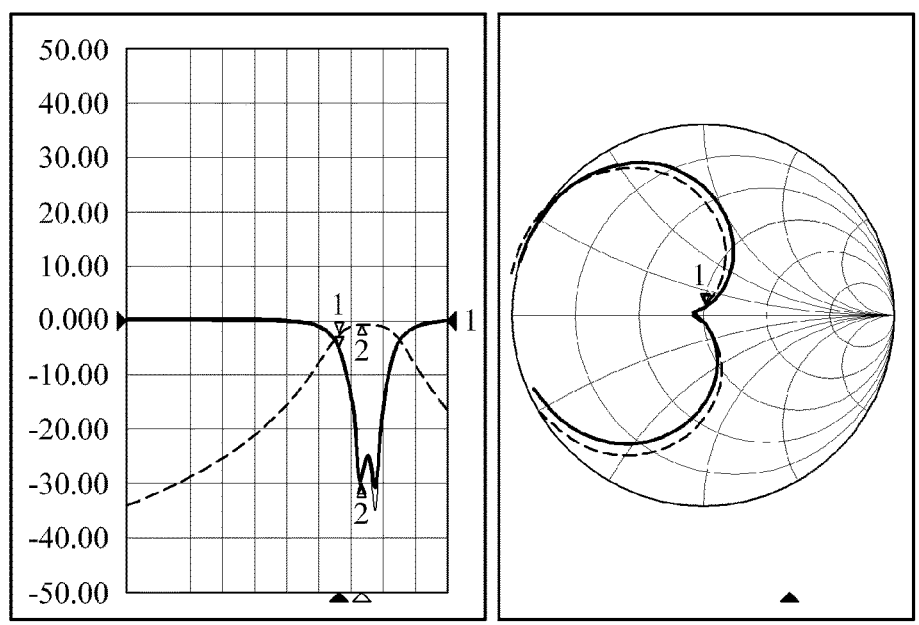
FIGS. 4A through 5B are graphs illustrating power transmission efficiency depending on a transmission distance based on a transmitting resonator and a receiving resonator of identical sizes according to an embodiment of the present invention.

FIG. 4A illustrates a graph indicating an $S_{21}$ when a distance between the transmitting resonator and the receiving resonator is 20 cm, and a Smith chart. Referring to the graph of FIG. 4A, 50$\Omega$ matching may be found at a resonant frequency of 1.935 megahertz (MHz). Here, the $S_{21}$ may indicate −0.775 decibels (dB) and efficiency may be 83.6%.

Figure 4B:
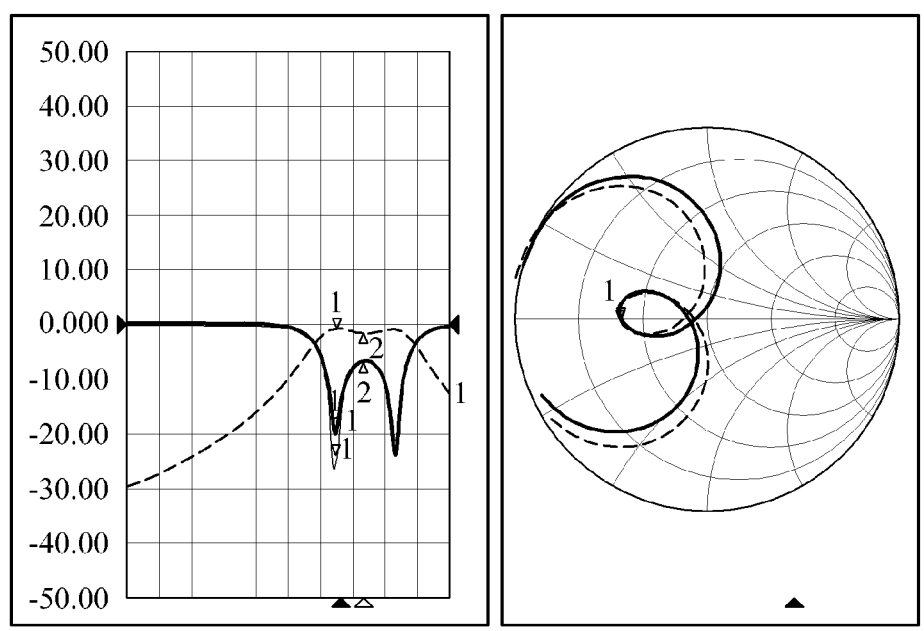

FIG. 4B illustrates a graph indicating an $S_{21}$ when a distance between the transmitting resonator and the receiving resonator is 15 cm, and a Smith chart. Here, a resonant frequency may be separated into two components. At a lower resonant frequency of 1.854 MHz, the $S_{21}$ may indicate −0.691 dB and efficiency may be 85.3%. Also, at 1.935 MHz, the $S_{21}$ may indicate −1.472 dB and efficiency may be 71.2%. The efficiency may decrease in comparison to the efficiency indicated when the distance between the transmitting resonator and the receiving resonator is 20 cm.

Figure 5A:
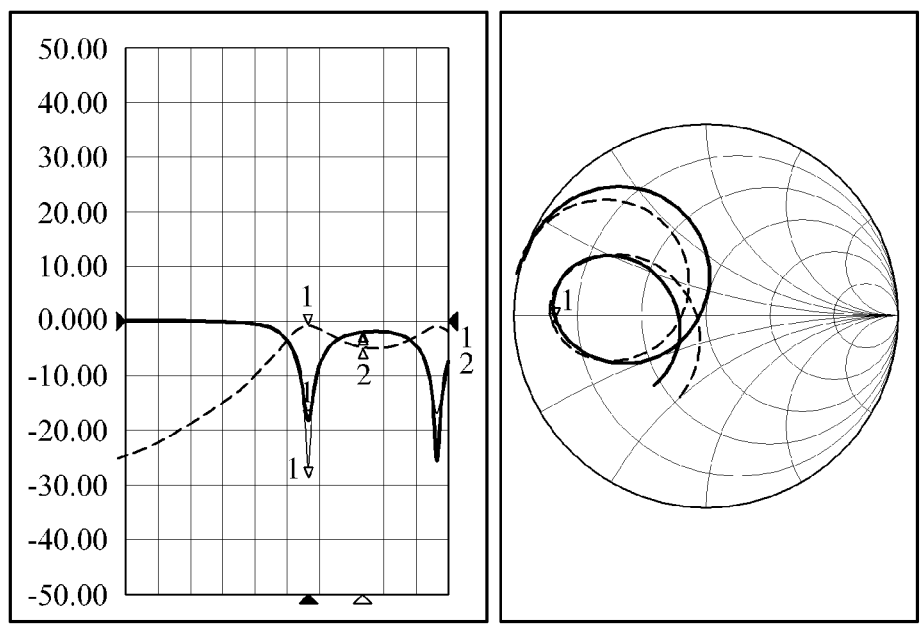

FIG. 5A illustrates a graph indicating an $S_{21}$ when a distance between the transmitting resonator and the receiving resonator is 10 cm, and a Smith chart. Here, a resonant frequency may be separated into two components with an increased interval therebetween. At a lower resonant frequency of 1.767 MHz, the $S_{21}$ may indicate −0.658 dB and efficiency may be 85.9%. Also, at 1.935 MHz, the $S_{21}$ may indicate −4.562 dB and efficiency may be 34.9%. The efficiency may further decrease in comparison to the efficiency indicated when the distance between the transmitting resonator and the receiving resonator is 20 cm.

Figure 5B:
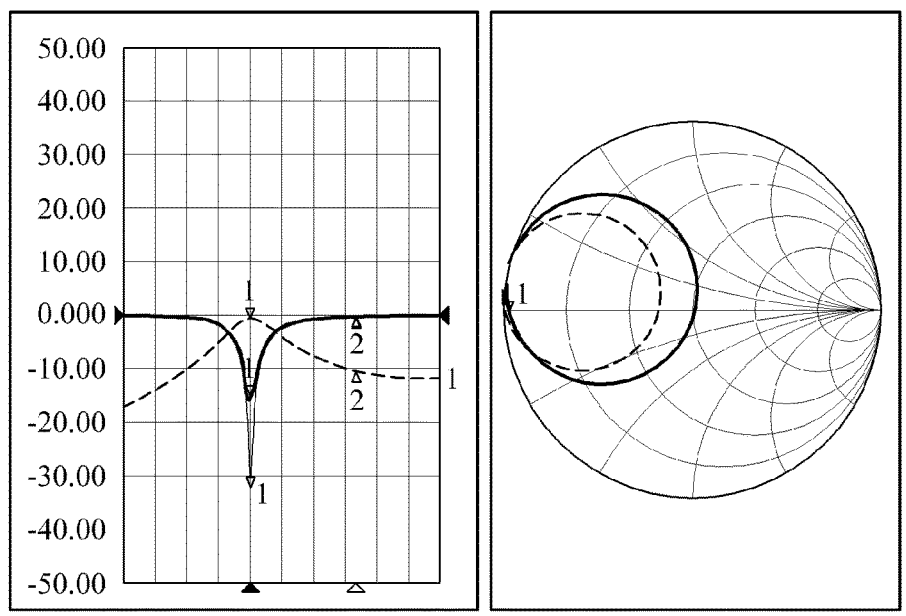

FIG. 5B illustrates a graph indicating an $S_{21}$ when a distance between the transmitting resonator and the receiving resonator is 5 cm, and a Smith chart. Here, a resonant frequency may be separated into two components with a further increased interval therebetween. At a lower resonant frequency of 1.704 MHz, the $S_{21}$ may indicate −0.590 dB and efficiency may be 87.3%. At 1.935 MHz, the $S_{21}$ may indicate −10.4 dB and efficiency may be 9.1%. As described in the foregoing, the efficiency may decrease as the distance between the transmitting resonator and the receiving resonator decreases.

Thus, a frequency tracking function that may track a resonant frequency to allow power to be transmitted at a lower resonant frequency may be required to maintain a constant efficiency. Although power transmitting technology to which the frequency tracking function is applied may be available, the technology may be inefficient in terms of frequency because a broad frequency band is required. Accordingly, technology for maintaining an initial resonant frequency may be required.

FIGS. 6A through 8B are graphs illustrating transmitting port impedance matching and power transmission efficiency depending on a transmission distance based on a transmitting resonator and a receiving resonator identical in size according to an embodiment of the present invention.

Figure 6A:
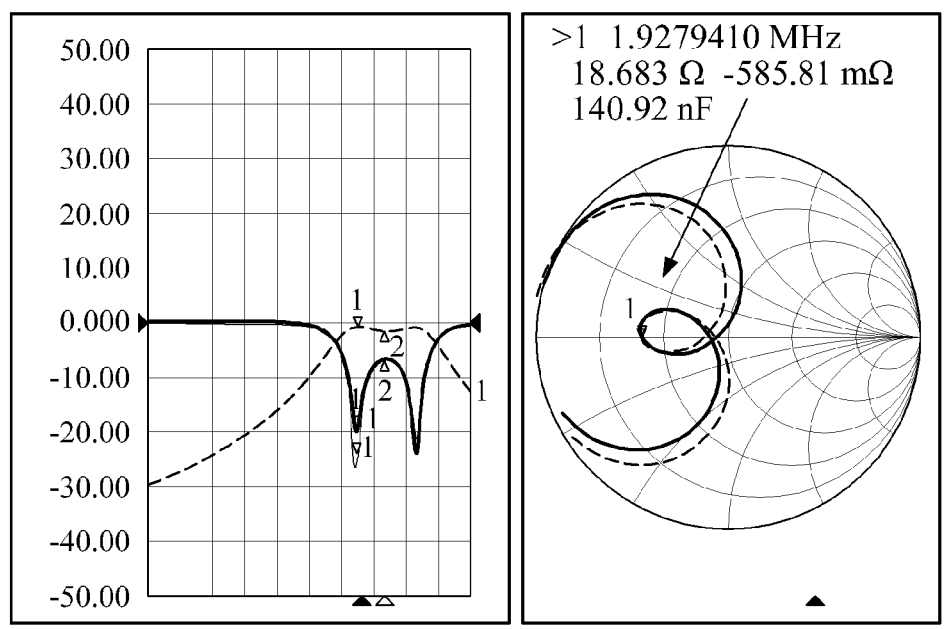
FIGS. 6A through 8B are graphs illustrating transmitting port impedance matching and power transmission efficiency depending on a transmission distance based on a transmitting resonator and a receiving resonator of identical sizes according to an embodiment of the present invention.
Figure 6B:
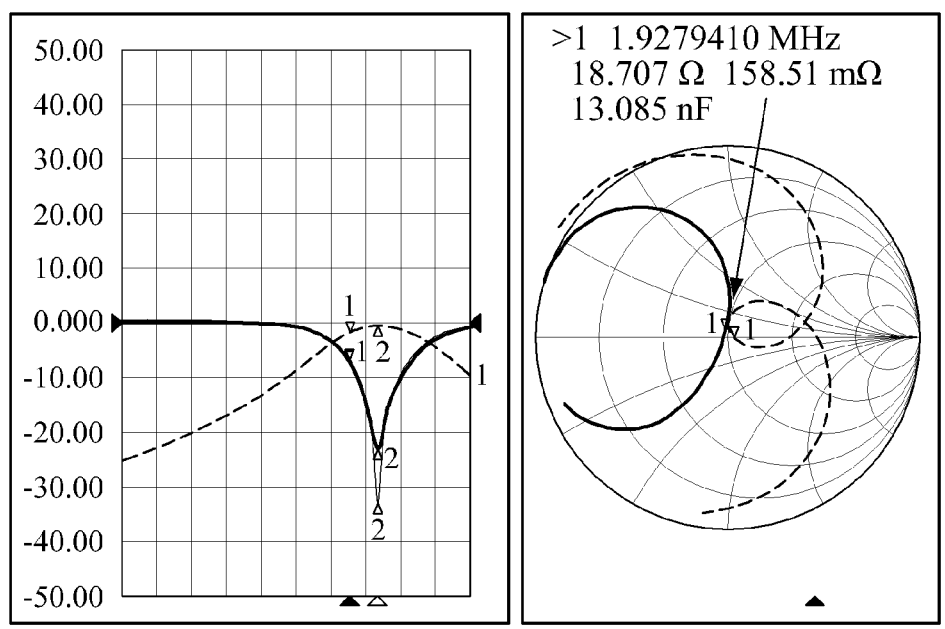
Figure 7A:
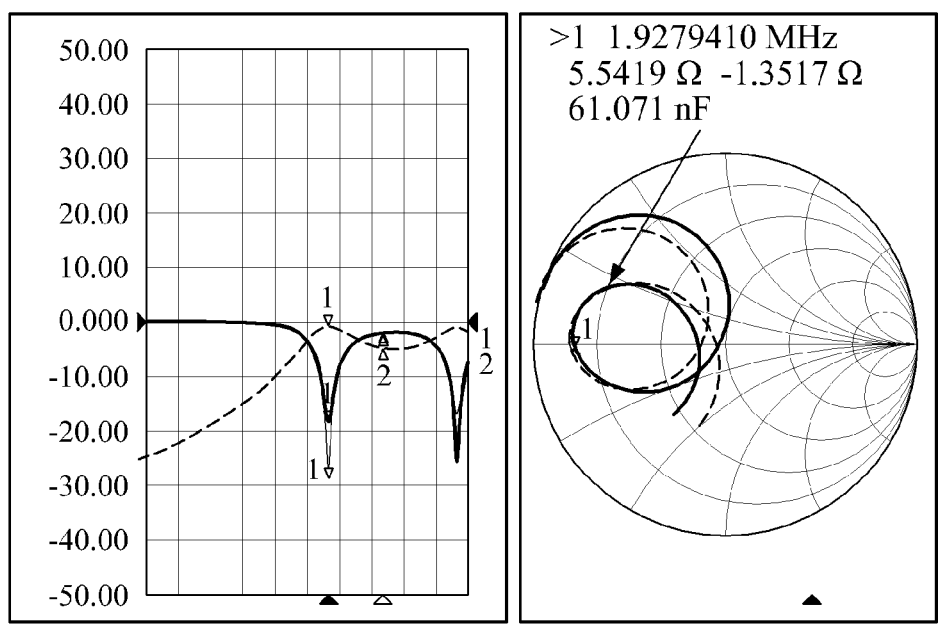
Figure 7B:
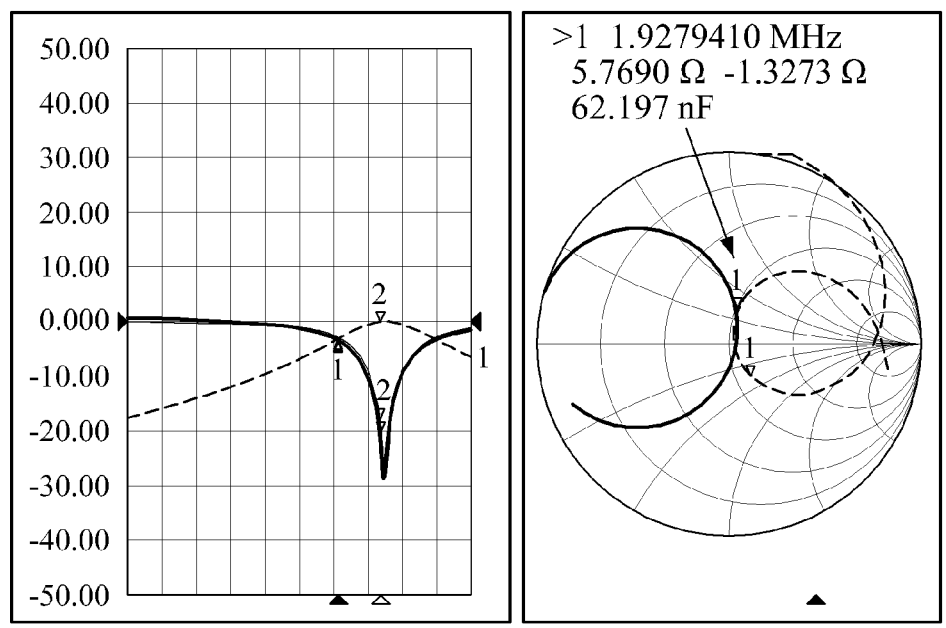
Figure 8A:
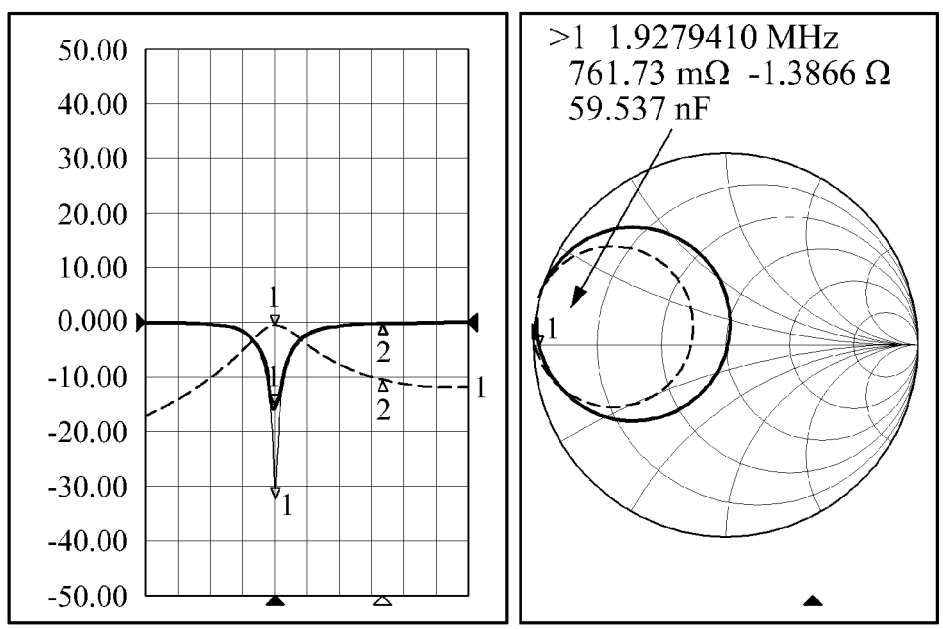

Graphs illustrated in FIGS. 6A, 7A, and 8A may indicate a transfer function $S_{21}$ of a magnetic resonance structure in which both a transmitting port impedance and a receiving port impedance are 50Ω. Graphs illustrated in FIGS. 6B, 7B, and 8B may indicate an $S_{21}$ of a magnetic resonance structure in which a receiving port impedance is set to be 50Ω and a transmitting port impedance is set to be a real number value of an input impedance detected at a resonant frequency of 1.935 MHz.

FIG. 6A illustrates a graph indicating an $S_{21}$ when a distance between the transmitting resonator and the receiving resonator is 15 cm, and a Smith chart. Here, a resonant frequency may be separated into two. At a lower resonant frequency of 1.854 MHz, the $S_{21}$ may indicate −0.691 dB and efficiency may be 85.3%.

FIG. 6B illustrates a result of matching a transmitting port impedance to a real number value of an input impedance detected at 1.935 MHz. For example, when the input impedance detected at 1.935 MHz is 18.683-j0.585Ω, the transmitting port impedance may match 18Ω. Here, the resonant frequency may be identical to the resonant frequency when the distance between the transmitting resonator and the receiving resonator is 20 cm. At the resonant frequency of 1.935 MHz, the $S_{21}$ may indicate −0.444 dB and efficiency may increase to 90.28%.

FIG. 7A illustrates a graph indicating an $S_{21}$ when a distance between the transmitting resonator and the receiving resonator is 10 cm, and a Smith chart. Here, a resonant frequency may be separated into two components with an increased interval therebetween. At a lower resonant frequency of 1.767 MHz, the $S_{21}$ may indicate −0.658 dB and efficiency may be 85.9%.

FIG. 7B illustrates a result of matching a transmitting port impedance to a real number value of an input impedance detected at 1.935 MHz. For example, when the input impedance detected at 1.935 MHz is 5.54-j1.35Ω, the transmitting port impedance may match 5Ω. Here, the resonant frequency may be identical to the resonant frequency when the distance between the transmitting resonator and the receiving resonator is 20 cm. At the resonant frequency of 1.935 MHz, the $S_{21}$ may indicate −0.095 dB and efficiency may increase to 97.8%.

FIG. 8A illustrates a graph indicating an $S_{21}$ when a distance between the transmitting resonator and the receiving resonator is 5 cm, and a Smith chart. Here, a resonant frequency may be separated into two components with a further increased interval therebetween. At a lower resonant frequency of 1.704 MHz, the $S_{21}$ may indicate −0.590 dB and efficiency may be 87.3%.

Figure 8B:
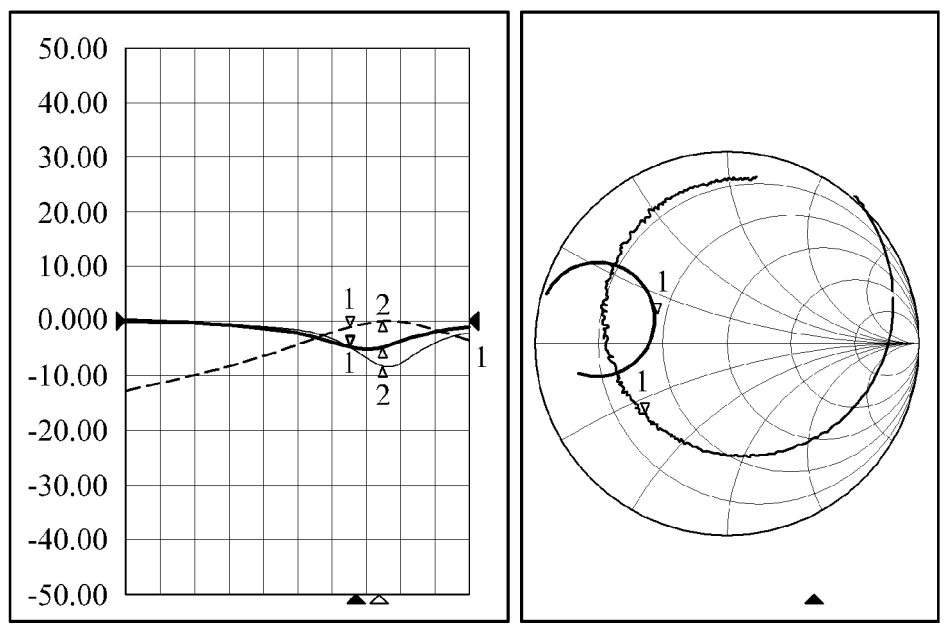

FIG. 8B illustrates a result of matching a transmitting port impedance to a real number value of an input impedance detected at 1.935 MHz. For example, the transmitting port impedance may match 3Ω, which is the real number value of the input impedance detected at 1.935 MHz. Here, the resonant frequency may be identical to the resonant frequency when the distance between the transmitting resonator and the receiving resonator is 20 cm. At the resonant frequency of 1.935 MHz, the $S_{21}$ may indicate −0.069 dB and efficiency may increase to 98.4%.

As described in the foregoing, a higher power transmission efficiency may be obtained and efficiency in terms of frequency may be achieved by detecting an input impedance at a desired resonant frequency and matching a transmitting port impedance to a real number value of the detected input impedance. Also, a simpler implementation may be enabled by matching only the transmitting port impedance, without matching a receiving port impedance, and matching only a real number value of the transmitting port impedance. Further, spectrum efficiency may be maximized by matching the transmitting port impedance to the real number value of the input impedance and unifying resonant frequencies despite a decreased distance between the transmitting resonator and the receiving resonator.

Figure 9:
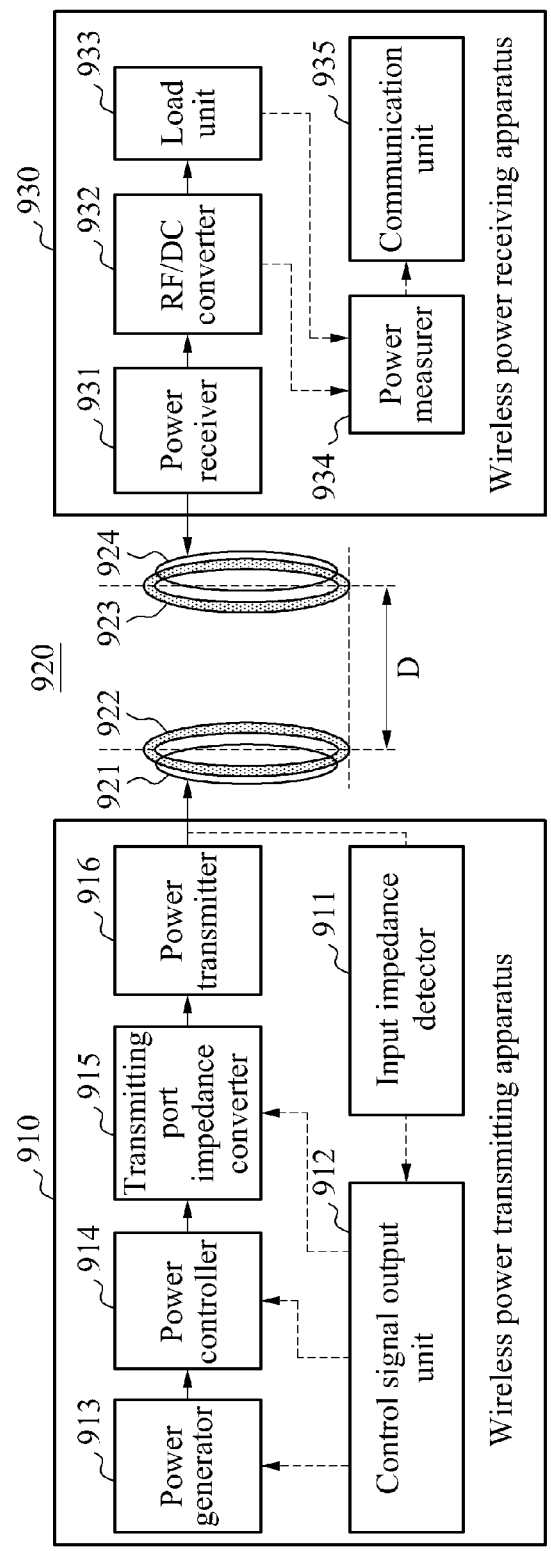
FIG. 9 is a diagram illustrating an example of a configuration of a wireless power transmitting system according to an embodiment of the present invention.

FIG. 9 is a diagram illustrating an example of a configuration of a wireless power transmitting system according to an embodiment of the present invention.

Referring to FIG. 9, the wireless power transmitting system may include a wireless power transmitting apparatus 910, a wireless power transfer apparatus 920, and a wireless power receiving apparatus 930. The wireless power transmitting apparatus 910 may transmit generated power to the wireless power receiving apparatus 930 through the wireless power transfer apparatus 920.

The wireless power transmitting apparatus 910 may include an input impedance detector 911, a control signal output unit 912, a power generator 913, a power controller 914, a transmitting port impedance converter 915, and a power transmitter 916.

The input impedance detector 911 may detect, as an input impedance, an impedance of the wireless power transfer apparatus 920 in association with the power transfer transmitting apparatus 910 at a resonant frequency. For example, the input impedance detector 911 may detect an input impedance of a transmitting resonator 922 connected to the wireless power transmitting apparatus 910 at the resonant frequency. The input impedance detector 911 may detect, using a network analyzer, the input impedance by measuring power input and reflected to the wireless power transfer apparatus 920.

Here, the resonant frequency my indicate a frequency at which resonance occurs between the transmitting resonator 922 and a receiving resonator 923, and be adjusted by a user. The wireless power transmitting apparatus 910 may transmit power to the wireless power receiving apparatus 930 at the resonant frequency.

The control signal output unit 912 may output a control signal to adjust a frequency and a magnitude of power and a transmitting port impedance. For example, the control signal output unit 912 may output the control signal to adjust the transmitting port impedance based on the input impedance detected by the input impedance detector 911. Also, the control signal output unit 912 may additionally consider an amount of power consumed in the wireless power receiving apparatus 930 and a radio frequency/direct current (RF/DC) conversion efficiency of the wireless power receiving apparatus 930 that are received from a communication unit 935. More particularly, in a case of constant current (CC) charging, a voltage to be provided to a load unit 933 may increase based on a charging value. Here, the control signal output unit 912 may output the control signal based on the voltage to be provided to the load unit 933. Here, the voltage may be obtained based on the amount of power consumed in the wireless power receiving apparatus 930 and the RF/DC conversion efficiency of the wireless power receiving apparatus 930.

The power generator 913 may generate power at a frequency based on the control signal of the control signal output unit 912. The power generator 913 may generate power in a range of an alternating current (AC) and an RF.

The power controller 914 may control a magnitude of the power generated by the power generator 913 based on the control signal of the control signal output unit 912.

The transmitting port impedance converter 915 may convert a transmitting port impedance based on the control signal of the control signal output unit 912. In an example, the transmitting port impedance converter 915 may convert the transmitting port impedance to match a real number value of the input impedance based on the control signal. More particularly, the transmitting port impedance converter 915 may convert the transmitting port impedance by controlling a distance between a feeding coil 921 and the transmitting resonator 922.

In another example, the transmitting port impedance converter 915 may automatically convert the transmitting port impedance using an RF tuner.

The power transmitter 916 may transmit power to the wireless power receiving apparatus 930 through the transmitting resonator 922 at the resonant frequency based on the converted transmitting port impedance.

The wireless power transfer apparatus 920 may include the feeding coil 921, the transmitting resonator 922, the receiving resonator 923, and a receiving coil 924.

The feeding coil 921 may feed the power generated from the wireless power transmitting apparatus 910 to the transmitting resonator 922.

The transmitting resonator 922 that is connected to the wireless power transmitting apparatus 910 may transmit the power to the receiving resonator 923 at the resonant frequency.

The receiving resonator 923 that is connected to the wireless power receiving apparatus 930 may receive the power from the transmitting resonator 922 at the resonant frequency.

The receiving coil 924 may transfer the power received from the receiving resonator 923 to the wireless power receiving apparatus 930.

The wireless power receiving apparatus 930 may include a power receiver 931, an RF/DC converter 932, the load unit 933, a power measurer 934, and the communication unit 935.

The power receiver 931 may receive the power from the transmitting resonator 922 connected to the wireless power transmitting apparatus 910 at the resonant frequency.

The RF/DC converter 932 may convert the power received from the power receiver 931 from an RF to a DC.

The load unit 933 may consume the received power. The load unit 933 may consume the DC power converted from the RF by the RF/DC converter 932.

The power measurer 934 may measure an amount of the power consumed in the load unit 933 and an RF/DC conversion efficiency of the RF/DC converter 932.

The communication unit 935 may transmit the consumed amount of the power and the RF/DC conversion efficiency that are measured by the power measurer 934 to the control signal output unit 912 of the wireless power transmitting apparatus 910.

In FIG. 9, lines that indicate a relationship between blocks may indicate a flow of power, and dotted lines may indicate a control signal excluding the power.

As described in the foregoing, the wireless power transmitting system may maximize efficiency by controlling an amount of power and an input impedance based on a status of the wireless power receiving apparatus 930, minimize power surplus by proving power at a required load, and unify resonant frequencies.

Figure 10:
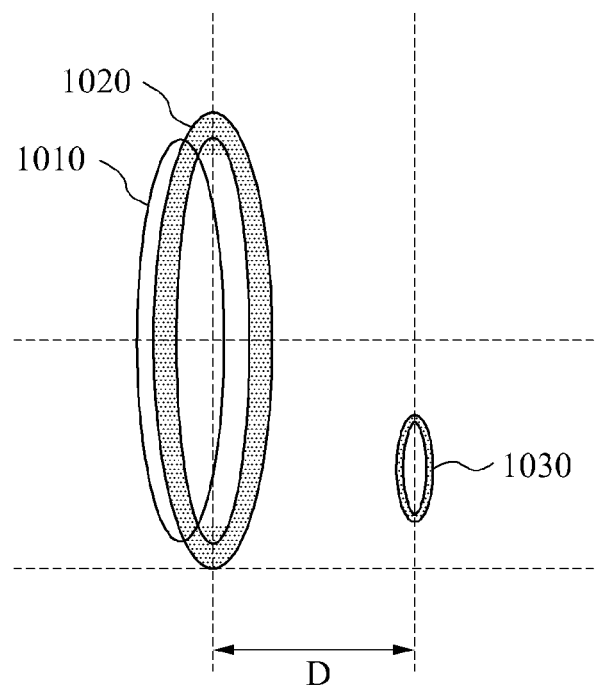
FIG. 10 is a diagram illustrating an example of a wireless power transfer apparatus including a transmitting resonator and a receiving resonator smaller than the transmitting resonator according to an embodiment of the present invention.

FIG. 10 is a diagram illustrating an example of a wireless power transfer apparatus including a transmitting resonator 1020 and a receiving resonator 1030 smaller than the transmitting resonator according to an embodiment of the present invention.

Referring to FIG. 10, the wireless power transfer apparatus may include a feeding coil 1010, the transmitting resonator 1020, and the receiving resonator 1030.

The receiving resonator 1030 may have a size smaller than a size of the transmitting resonator 1020. The receiving resonator 1030 may include a receiving coil.

FIGS. 11A through 12B are graphs illustrating power transmission efficiency depending on a transmission distance based on a receiving resonator smaller than a transmitting resonator according to an embodiment of the present invention Referring to FIGS. 11A through 12B, the power transmission efficiency may be measured based on a transmitting resonator with a diameter of 30 cm and a receiving resonator with a diameter of 7 cm. Here, a transmitting port impedance and a receiving port impedance may be 50Ω.

Figure 11A:
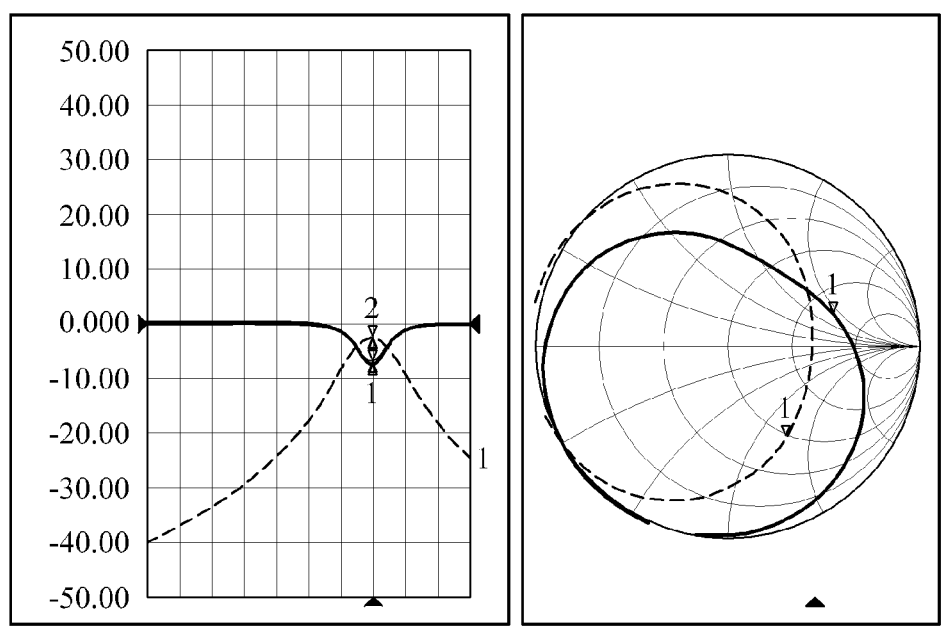
FIGS. 11A through 12B are graphs illustrating power transmission efficiency depending on a transmission distance based on a receiving resonator smaller than a transmitting resonator according to an embodiment of the present invention.

FIG. 11A illustrates a graph indicating a transfer function $S_{21}$ when a distance between the transmitting resonator and the receiving resonator is 5 cm, and a Smith chart. Here, resonance may occur at 1.894 MHz, and the $S_{21}$ may indicate −2.513 dB and efficiency may be 56%. Also, the transmitting port impedance and the receiving port impedance may be formed close to 140Ω, which is considerably greater than 50Ω and thus, the efficiency may be low.

Figure 11B:
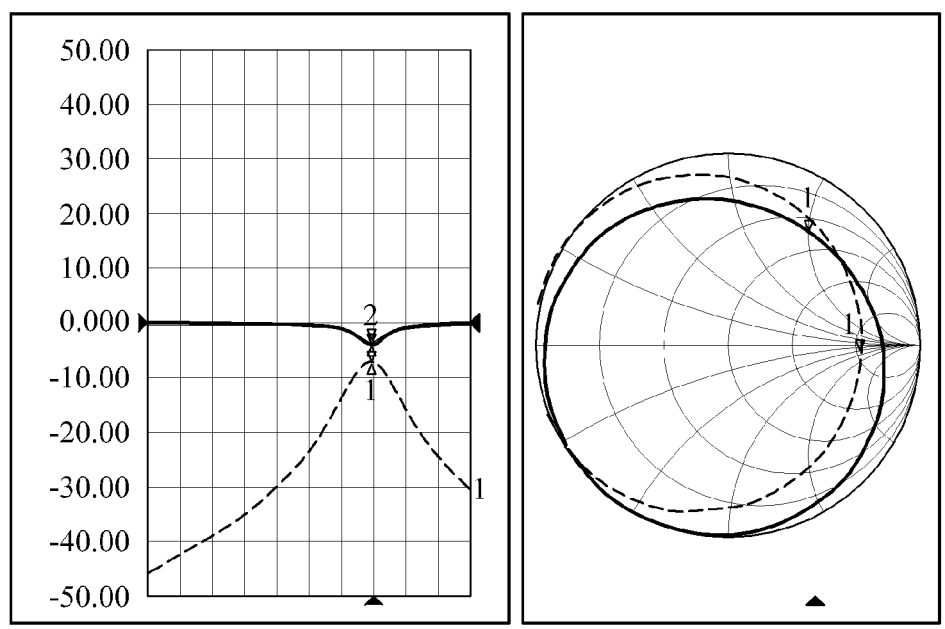
Figure 12A:
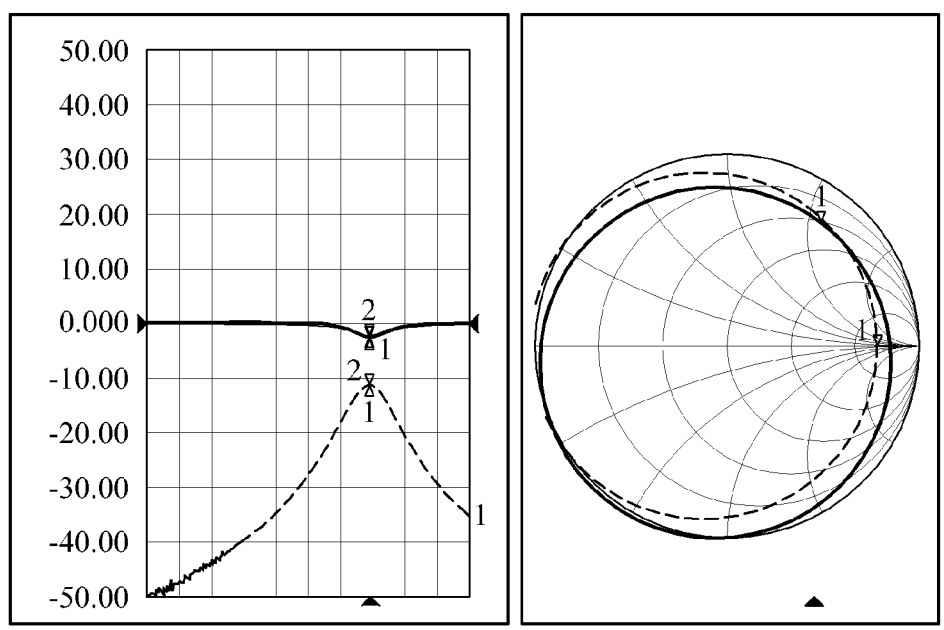
Figure 12B:
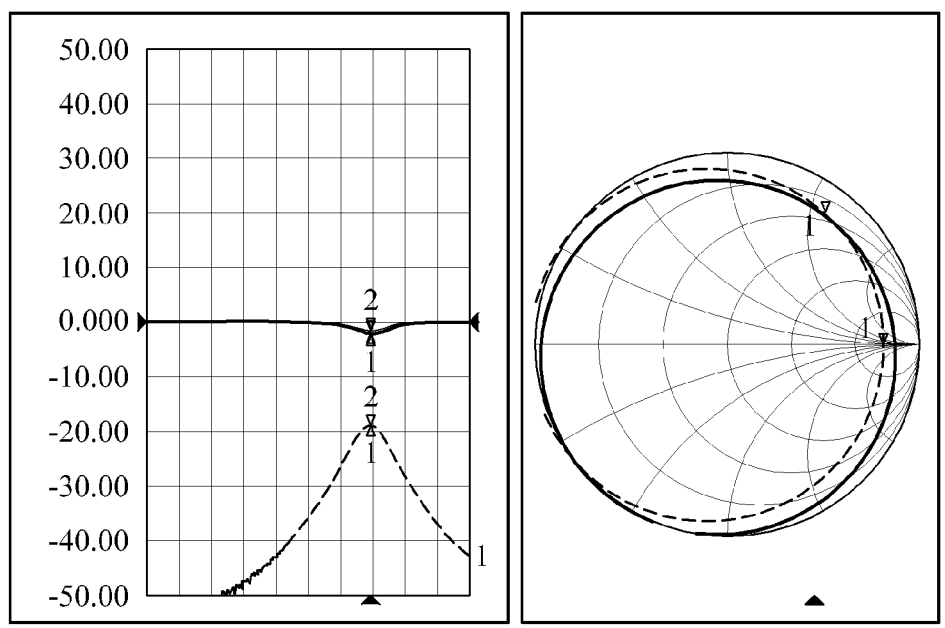

Referring to FIGS. 11B, 12A, and 12B, a significant decrease in the efficiency may occur as the transmission distance increases. For example, when the distance between the transmitting resonator and the receiving resonator is 20 cm, the transmitting port impedance may increase to 48Ω, and the $S_{21}$ may decrease to −18.86 dB.

FIGS. 13A through 14B are graphs illustrating transmitting port impedance matching and power transmission efficiency depending on a transmission distance based on a receiving resonator smaller than a transmitting resonator according to an embodiment of the present invention Referring to FIGS. 13A through 14B, the power transmission efficiency may be measured by performing transmitting port impedance matching, and measured based on a transmitting resonator with a diameter of 30 cm and a receiving resonator with a diameter of 7 cm.

Figure 13A:
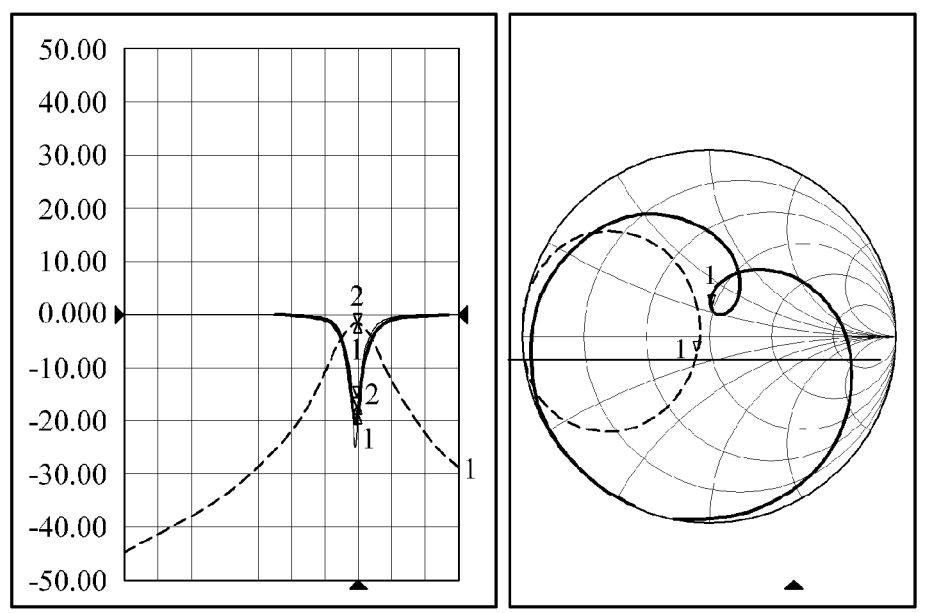
FIGS. 13A through 14B are graphs illustrating transmitting port impedance matching and power transmission efficiency depending on a transmission distance based on a receiving resonator smaller than a transmitting resonator according to an embodiment of the present invention.

FIG. 13A illustrates a graph indicating a transfer function $S_{21}$ when a distance between the transmitting resonator and the receiving resonator is 5 cm, and a Smith chart. Here, a transmitting port impedance may match a real number value of an input impedance, which is 143Ω. Also, a resonant frequency may be 1.894 MHz, the $S_{21}$ may indicate −1.65 dB, and the efficiency may be 68%.

Figure 13B:
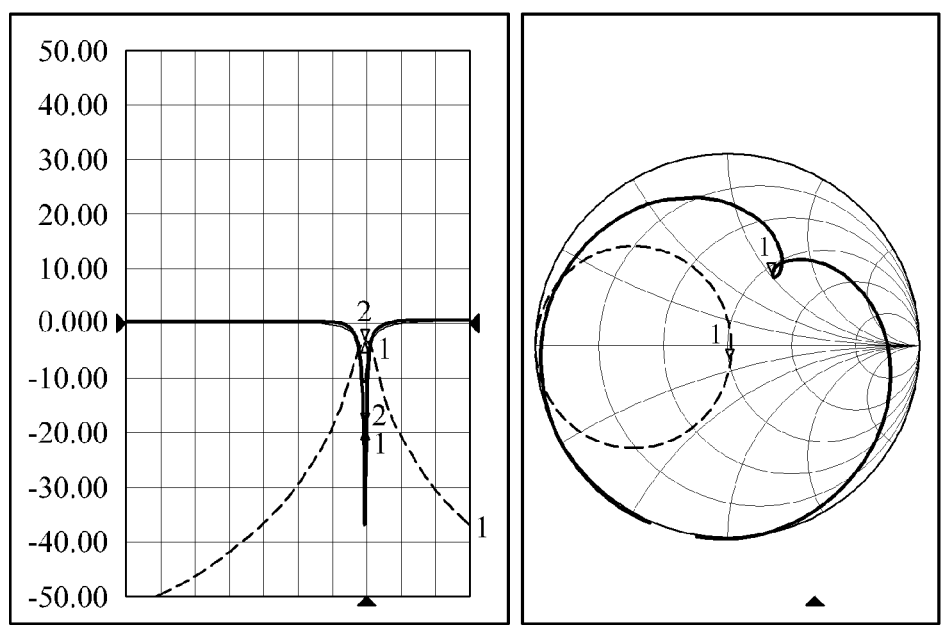
Figure 14A:
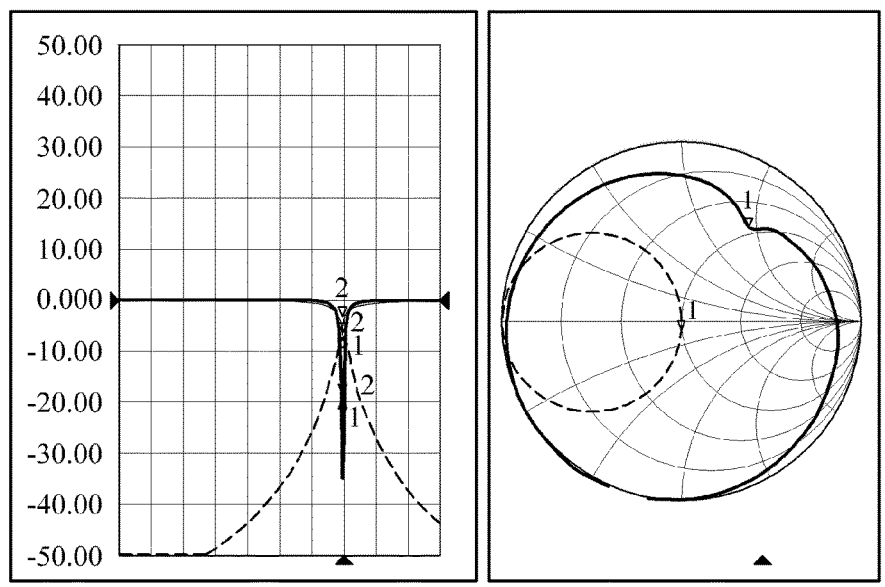
Figure 14B:
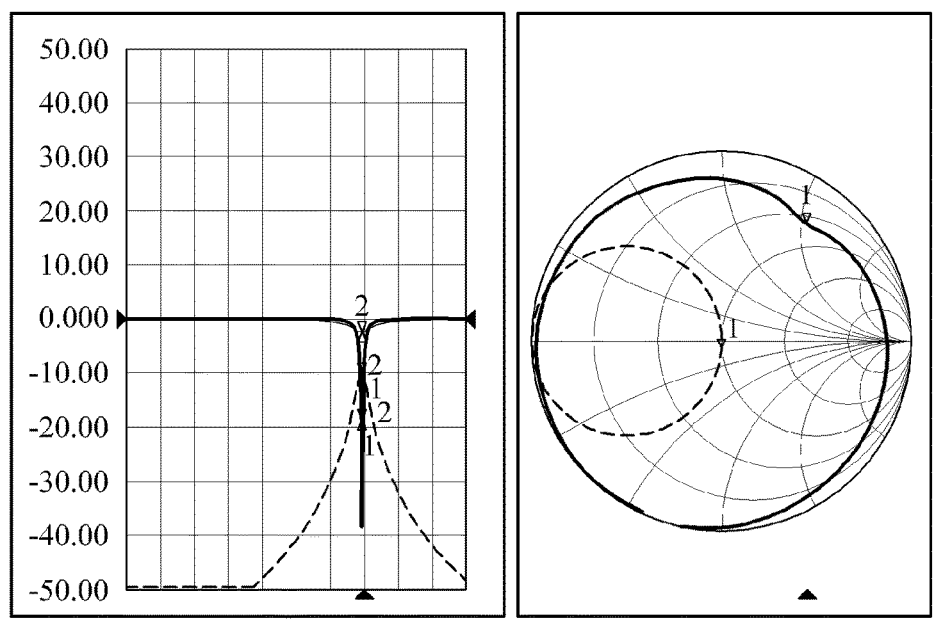

Referring to FIGS. 13B, 14A, and 14B, the efficiency may not be greater than or equal to 70% when the transmission distance increases despite the transmitting port impedance matching.

Figure 15:
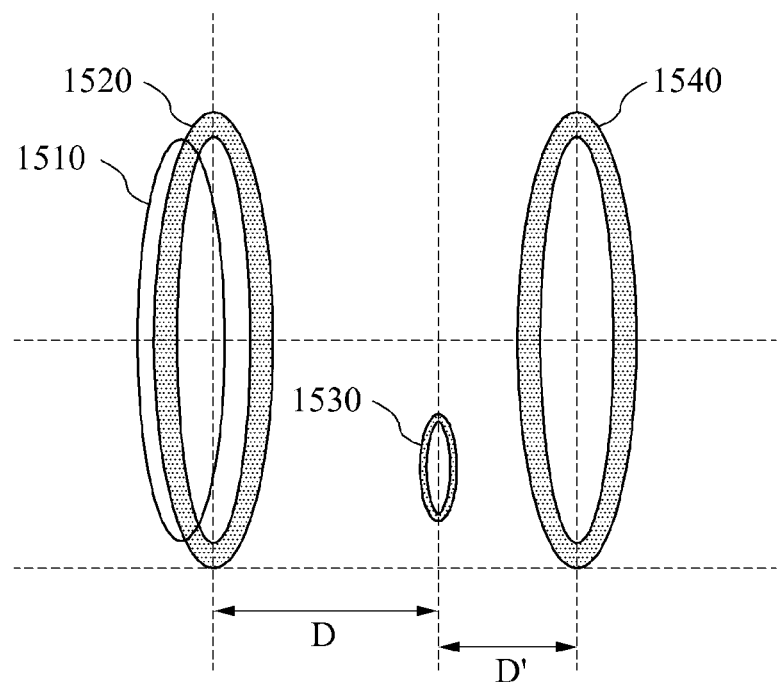
FIG. 15 is a diagram illustrating an example of a wireless power transfer apparatus using a relay resonator according to an embodiment of the present invention.

FIG. 15 is a diagram illustrating an example of a wireless power transfer apparatus 1500 using a relay resonator 1540 according to an embodiment of the present invention.

Referring to FIG. 15, the wireless power transfer apparatus 1500 may include a feeding coil 1510, a transmitting resonator 1520, a receiving resonator 1530, and the relay resonator 1540.

The transmitting resonator 1520 may transmit power generated from a wireless power transmitting apparatus to the receiving resonator 1530 at a resonant frequency.

The receiving resonator 1530 may receive the power from the transmitting resonator 1520 using the relay resonator 1540. Here, a size of the receiving resonator 1520 may be smaller than a size of the transmitting resonator 1520. The receiving resonator 1530 may include a receiving coil.

The relay resonator 1540 may control a receiving efficiency of the receiving resonator 1530 by adjusting a distance (D') from the receiving resonator 1530. A size of the relay resonator 1540 may be identical to the size of the transmitting resonator 1520. The relay resonator 1540 may have an identical axis to the transmitting resonator 1520.

In an example, when a value of D between the receiving resonator 1530 and the transmitting resonator 1520 decreases, a role of the relay resonator 1540 may be reversed with a role of the transmitting resonator 1520 to prevent a decrease in power transmission efficiency.

More particularly, the wireless power transfer apparatus 1500 may include a switch disposed between a T-shaped area in a state in which power is fed to the transmitting resonator 1520 and the relay resonator 1540. Here, the wireless power transfer apparatus 1500 may change roles of the relay resonator 1540 and the transmitting resonator 1520 by controlling the switch.

The closer a counterpart resonator is to the receiving resonator 1530, the simpler performing impedance matching may be. Thus, the wireless power transfer apparatus 1500 may perform the impedance matching on the receiving resonator 1530 along with either any of the relay resonator 1540 and the transmitting resonator 1520, depending on which is closer to the receiving resonator 1530. Accordingly, the wireless power transfer apparatus 1500 may prevent the decrease in the power transmission efficiency.

Here, a size of a resonator may indicate a diameter of the resonator.

In an example, when a diameter of the transmitting resonator 1520 is 30 cm, a diameter of the receiving resonator 1530 is 7 cm, and a diameter of the relay resonator 1540 is 30 cm, a transfer function $S_{21}$ may be indicated as follows.

Table 1 shows a transfer function $S_{21}$ based on a value of D' between the receiving resonator 1530 and the relay resonator 1540 when a value of D between the transmitting resonator 1520 and the receiving resonator 1530 is 15 cm.

Non-matching may be a case in which a transmitting port impedance and a receiving port impedance are set to be 50Ω. Here, the efficiency may decrease when a value of D' between the receiving resonator 1530 and the relay resonator 1540 is changed from 3 cm to 7 cm.

Transmitting port impedance matching may be a case in which a transmitting port impedance matches a real number value of an input impedance, which is 24Ω. Here, the efficiency may be further improved in the case of the transmitting port impedance matching in comparison to the case of the non-matching.

TABLE 1

| D' (cm) | 3 | 5 | 7 |
|---|---|---|---|
| Non-matching (50Ω) [$S_{21}$] | −0.95 dB | −1.4 dB | −2.08 dB |
| Transmitting port impedance matching ($P_1$ = 24Ω) [$S_{21}$] | −1.04 dB | −1.05 dB | −1.39 dB |

Table 2 shows a transfer function $S_{21}$ based on a value of D' between the receiving resonator 1530 and the relay resonator 1540 when a value of D between the transmitting resonator 1520 and the receiving resonator 1530 is 10 cm.

Non-matching may be a case in which a transmitting port impedance and a receiving port impedance are set to be 50Ω. Here, the efficiency may decrease when a value of D' between the receiving resonator 1530 and the relay resonator 1540 is changed from 3 cm to 7 cm.

Transmitting port impedance matching may be a case in which a transmitting port impedance matches a real number value of an input impedance, which is 24Ω. Here, the efficiency may be further improved in the case of the transmitting port impedance matching in comparison to the case of the non-matching.

TABLE 2

| D' (cm) | 3 | 5 | 7 |
|---|---|---|---|
| Non-matching (50Ω) [$S_{21}$] | −2.6 dB | −3.5 dB | −4.6 dB |
| Transmitting port impedance matching ($P_1$ = 9Ω) [$S_{21}$] | −0.54 dB | −0.56 dB | −1.07 dB |

Table 3 shows a transfer function $S_{21}$ based on a value of D' between the receiving resonator 1530 and the relay resonator 1540 when a value of D between the transmitting resonator 1520 and the receiving resonator 1530 is 5 cm.

Non-matching may be a case in which a transmitting port impedance and a receiving port impedance are set to be 50Ω. Here, the efficiency may decrease when a value of D' between the receiving resonator 1530 and the relay resonator 1540 is changed from 3 cm to 7 cm.

Transmitting port impedance matching may be a case in which a transmitting port impedance matches a real number value of an input impedance, which is 24Ω. Here, the efficiency may be further improved in the case of the transmitting port impedance matching in comparison to the case of the non-matching.

TABLE 3

| D' (cm) | 3 | 5 | 7 |
|---|---|---|---|
| Non-matching (50Ω) [$S_{21}$] | −5.0 dB | −6.3 dB | −7.2 dB |
| Transmitting port impedance matching ($P_1 = 9Ω$) [$S_{21}$] | −0.1 dB | −0.34 dB | −0.91 dB |

As described in the foregoing, the wireless power transfer apparatus 1500 may increase a power transmission distance by disposing, behind the receiving resonator 1530, the relay resonator 1540 having a size identical to a size of the transmitting resonator 1520 and using the receiving resonator 1530 having a size smaller than a size of the transmitting resonator 1520. The wireless power transfer apparatus 1500 may obtain a greater power transmission efficiency using the transmitting port impedance matching.

Further, the wireless power transfer apparatus 1500 may be used to overcome a spatial limitation to power transmission by increasing a transmission distance of the small-sized receiving resonator 1530 using the relay resonator 1540. Thus, the wireless power transfer apparatus 1500 may expand a near field for the power transmission using the relay resonator 1540.

According to an embodiment of the present invention, a simpler implementation may be enabled by matching only a transmitting port impedance, without matching a receiving port impedance, and matching only a real number value of the transmitting port impedance.

According to an embodiment of the present invention, spectrum efficiency may be maximized by matching a transmitting port impedance to a real number value of an input impedance and unifying resonant frequencies in an event of a decreased distance between a transmitting resonator and a receiving resonator.

According to an embodiment of the present invention, efficiency may be maximized by controlling an amount of power and an input impedance based on a status of a wireless power receiving apparatus, power surplus may be minimized by providing power with a required load, and resonant frequencies may be unified.

According to an embodiment of the present invention, a power transmission distance may increase using a receiving resonator smaller than a transmitting resonator by disposing, behind the receiving resonator, a relay resonator having a size identical to a size of the transmitting resonator.

According to an embodiment of the present invention, a spatial limitation to power transmission may be overcome and a near field for the power transmission may be expanded by increasing a transmission distance of a small-sized receiving resonator.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wireless power transmitting apparatus, the apparatus comprising:
  an input impedance detector to detect an input impedance of a transmitting resonator connected to the wireless power transmitting apparatus at a resonant frequency;
  a control signal output unit to output a control signal to control a transmitting port impedance based on the input impedance;
  a transmitting port impedance converter to convert the transmitting port impedance to match a real number value of the input impedance at the resonant frequency based on the control signal without a matching of a receiving port impedance; and
  a power transmitter to transmit power to a wireless power receiving apparatus through the transmitting resonator at the resonant frequency based on the converted transmitting port impedance,
  wherein the input impedance is determined based on a distance between the transmitting resonator and a receiving resonator connected to the wireless power receiving apparatus,
  wherein the transmitting port impedance is converted by adjusting a distance between the transmitting resonator and a feeding coil used to provide power to the transmitting resonator.

2. The apparatus of claim 1, wherein the control signal output unit outputs the control signal further based on an amount of power consumed in the wireless power receiving apparatus.

3. The apparatus of claim 1, wherein the transmitting port impedance is converted by adjusting a coupling coefficient $k_{12}$ determined based on a distance between the feeding coil and the transmitting resonator.

4. The apparatus of claim 3, wherein the coupling coefficient $k_{12}$ is determined to be larger as the distance between the feeding coil and the transmitting resonator decreases.

5. The apparatus of claim 1, wherein the input impedance is determined to be smaller as the distance between the transmitting resonator and the receiving resonator becomes closer.

6. A wireless power receiving apparatus, the apparatus comprising:
  a power receiver to receive power from a transmitting resonator connected to a wireless power transmitting apparatus at a resonant frequency; and
  a load unit consuming the received power,
  wherein the wireless power transmitting apparatus converts a transmitting port impedance to match a real number value of an input impedance of the transmitting resonator detected at the resonant frequency without a matching of a receiving port impedance and transmits power through the transmitting resonator, wherein the input impedance is determined based on a distance between the transmitting resonator and a receiving resonator connected to the wireless power receiving apparatus, and wherein the transmitting port impedance is converted by adjusting a distance between the transmitting resonator and a feeding coil used to provide power to the transmitting resonator.

7. The apparatus of claim 6, wherein the wireless power transmitting apparatus converts the transmitting port impedance by controlling a distance between the transmitting resonator and a feeding coil used to provide power to the transmitting resonator.

8. A wireless power transfer apparatus, the apparatus comprising:
- a transmitting resonator to transmit power generated from a wireless power transmitting apparatus to a receiving resonator at a resonant frequency; and
- the receiving resonator to receive the power from the transmitting resonator using a relay resonator,
- wherein a size of the receiving resonator is smaller than a size of the transmitting resonator,
- wherein the relay resonator controls a receiving efficiency of the receiving resonator by adjusting a distance from the receiving resonator,
- wherein the wireless power transmitting apparatus converts a transmitting port impedance to match a real number value of an input impedance of the transmitting resonator detected at the resonant frequency without a matching of a receiving port impedance and generates power,
- wherein the input impedance is determined based on a distance between the transmitting resonator and a receiving resonator connected to a wireless power receiving apparatus, and
- wherein the transmitting port impedance is converted by adjusting a distance between the transmitting resonator and a feeding coil used to provide power to the transmitting resonator.

9. The apparatus of claim 8, wherein the wireless power transmitting apparatus converts the transmitting port impedance by controlling a distance between the transmitting resonator and a feeding coil used to provide power to the transmitting resonator.

10. The apparatus of claim 8, wherein a size of the relay resonator is identical to a size of the transmitting resonator.

11. A wireless power transmitting method, the method comprising:
- detecting an input impedance of a transmitting resonator connected to a wireless power transmitting apparatus at a resonant frequency;
- outputting a control signal to adjust a transmitting port impedance based on the input impedance;
- converting the transmitting port impedance to match a real number value of the input impedance at the resonant frequency based on the control signal without a matching of a receiving port impedance; and
- transmitting power to a wireless power receiving apparatus through the transmitting resonator at the resonant frequency based on the converted transmitting port impedance,
- wherein the input impedance is determined based on a distance between the transmitting resonator and a receiving resonator connected to the wireless power receiving apparatus, and
- wherein the transmitting port impedance is converted by adjusting a distance between the transmitting resonator and a feeding coil used to provide power to the transmitting resonator.

12. The method of claim 11, wherein the converting is performed by controlling a distance between the transmitting resonator and a feeding coil used to provide power to the transmitting resonator.

\* \* \* \* \*